July 28, 1925.
R. D. RIFKIN
STORAGE BATTERY
Filed Aug. 30, 1923
1,547,447
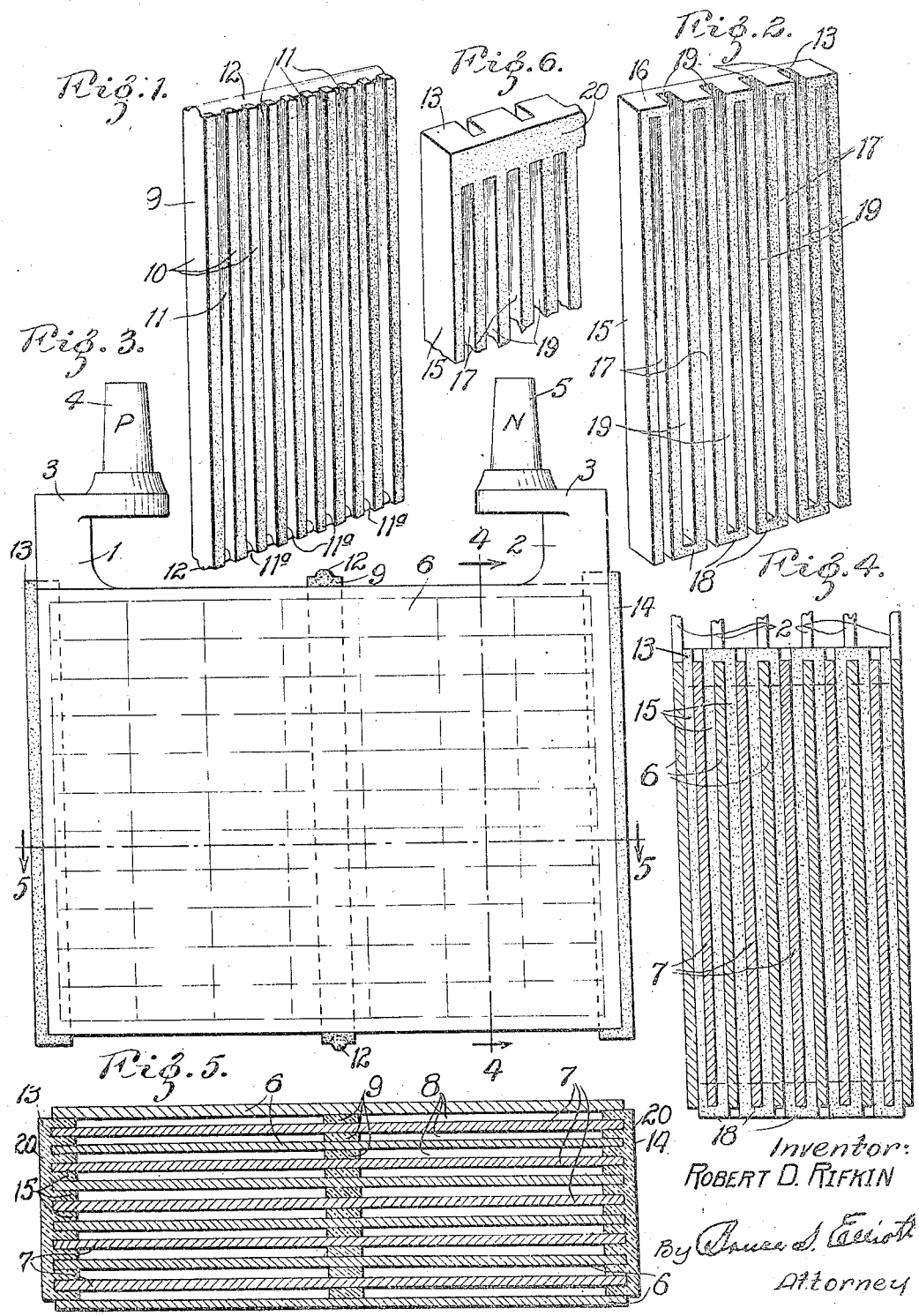
Inventor:
ROBERT D. RIFKIN
By James S. Elliott
Attorney Patented July 28, 1925.

1,547,447

UNITED STATES PATENT OFFICE.

ROBERT D. RIFKIN, OF ST. LOUIS, MISSOURI.

STORAGE BATTERY.

Application filed August 30, 1923. Serial No. 660,091.

*To all whom it may concern:*

Be it known that I, ROBERT D. RIFKIN, a citizen of the United States, residing in the city of St. Louis and State of Missouri, have invented new and useful Improvements in Storage Batteries, of which the following is a specification.

This invention relates to storage batteries and has for its general object the provision of novel means for insulating the positive and negative plates of a battery from each other and, at the same time, supporting and separating them and securely holding them in their fixed relative positions to each other at all times and under all conditions of use.

It is well known, especially to those skilled in the art of storage batteries, that in the great majority of instances in which a storage battery fails to operate, especially in the case of an automobile starting battery, such failure can be traced to the positive plates buckling or bending, and adjoining positive and negative plates pinching, cuffing or wearing through the intervening separator and coming together or touching. It is also well known that in the great majority of cases this contact takes place at the side edges of the plates and especially at the corners.

This invention comprises a novel insulator assembly, preferably of molded rubber, which effectually prevents and renders practically impossible under any conditions of actual use, any contact between the side edges or corners of adjoining positive and negative plates in a battery cell.

To this end, the invention comprises the provision of an insulator assembly, preferably of molded rubber, consisting of two end members and if desired an intermediate member, each of which operates as a combined insulator, separator and holder, and each of which, generally comprises a grid having vertically disposed spaces for receiving the plates of the battery, and so disposed that, when in position on the plates, each alternate recess will receive the positive plates, while the intervening recesses will receive the negative plates. The intermediate insulating member has the two sets of plates inserted into it from opposite directions while the end insulating members are inserted over the ends of the plates, and in the case of these members, the recesses are closed in alternation at the top and bottom so that one set of recesses supports the bottom edges of the plates of one set, while the alternate recesses receive and engage over the upper edge portions of the ends of the plates of the opposite set. In this way, the battery plates are securely held separated from each other in parallel relation. Additional insulation of the positive and negative plates from each other may be effected if necessary or desired, to prevent any electrical connection between adjoining positive and negative plates due to any growth or so-called "treeing" of material from positive to negative plates, or to any pellets of material loosening from either plate and wedging between adjacent positive and negative plates.

I will first describe the invention with reference to the accompanying drawing, and then point out some of the advantages incident to the use thereof, first premising that for briefness of description I will refer to the three members I use in practicing my invention, as "insulators" although each of them has the three-fold function of an insulator, separator, and holder.

In the drawing—

Figure 1 is a perspective view of the intermediate insulator;

Figure 2 is a similar view of one of the end insulators;

Figure 3 is a view in side elevation of the positive and negative plates of a battery assembled and insulated according to my invention;

Figure 4 is a sectional view on the line 4—4 of Figure 3;

Figure 5 is a sectional view on the line 5—5 of Figure 3; and

Figure 6 is a perspective view showing a portion of the reverse side of one of the end separators shown in Figure 2, to better illustrate the construction.

Referring now to the drawing, the numeral 1 indicates an assembly of positive plates and, 2, a similar assembly of negative plates, each set of plates being rigidly connected at their upper ends, as a unit, by a bridge 3 having, respectively, the positive and negative posts 4, 5. The plates of the negative assembly are indicated by the numeral 6 while the plates of the positive assembly are indicated by the numeral 7. As will be seen by an inspection of Figure 5, and as is well known, the space between the plates 6 is wide enough to accommodate the positive plates 7 and leave spaces 8 separating the two sets of plates. Referring to Figures 1, 3 and 5, the numeral 9 indicates what I term an intermediate insulator, which comprises a series of flat hard rubber bars 10, arranged in parallel relation to provide intervening spaces 11, and connected at their tops and bottoms by bridges 12, which are narrower than the bars 10, and rounded for the purpose of preventing, as far as possible, the deposit of any sediment thereon.

The bars 10 and bridges 12 are formed of hard rubber by molding, and hence, constitute an integral structure. The spaces 11 are so adjusted in position that the side spaces and every alternate space thereafter will receive the plates of the positive assembly, which, in the present instance, are five in number, while the other spaces will receive the plates of the negative assembly, which, in the present instance, are six in number, and which spaces, for purposes of identification, are indicated by 11$^a$. Only four of the spaces 11$^a$ are required, as the two outer plates of the negative assembly are located on the outside of the insulator 9, as shown by Figure 5. When inserted in the jar, these plates will be held firm by the sides of the jar.

Referring particularly to Figures 2, 4 and 6, the numeral 13 indicates one of the end insulating members which is that shown at the left of Figure 3, the corresponding member 14 shown at the right of Figure 3 having the identical construction, except that one member is turned upside down with reference to the other member. Each of these members, as in the case of the intermediate member 9, is of unitary structure and molded of hard rubber, and comprises a series of flat parallel bars 15, each pair of bars, beginning at the side, being connected at their upper ends by an integral web 16 to form spaces 17 closed at their upper end and open at their lower end, and each pair of bars after the first bar, from either side, being connected at their lower ends by integral webs 18 to form a series of parallel spaces 19 open at their upper ends. The upper and lower ends of all of the spaces 17 and 19 are closed at the top and bottom of the insulating members 13 and 14, on the rear side thereof, by a narrow back portion 20, such as shown, as the upper end of the member 13, in Figure 6.

As stated, the member 14 is of identical construction with the member 13, but in their assembled position, as shown in Figure 3, the spaces 17 are open at their top, and the spaces 19 closed. In other words, the bottom of the member 14, as to the relative arrangement of the spaces, corresponds to the top of the member 13.

In assembling the positive and negative groups of plates 1 and 2, the insulating member 9 is inserted on, say, the positive group of plates so that each one of these plates passes through a space 11. The negative group of plates 2 is then inserted through the insulator from the opposite direction and four plates of this group pass through the recesses 11$^a$, while the outer plates pass on the outer side of each of the side bars 10. The plates are moved inward until the front edges of one set lie flush with the rear edges of the other set. The end insulating members 13, 14 are now placed in position. This is done, as to the member 13, by inserting the recesses 17 over the ends of the positive plates 7 so that each pair of bars, connected by web 16, enters the spaces between the negative plates 6, as shown by Figure 5, and inserting the spaces 19 over the rear edges of the four inner plates of the negative group 2, in such manner that the bottom edges of these plates rest on the webs 18. The insulating member 14 is applied in the same manner except that the two outer recesses and the alternate recesses located between them are inserted over the rear ends of the plates of the negative group with the bottom edge portions of these plates resting on the webs closing these recesses at the bottom, while the intervening recesses, in alternation, receive the ends of the four inner plates of the negative group, and webs at the upper end of member 14 rest upon the upper edges of these plates. This arrangement is clearly illustrated in Figure 4. When thus assembled, the negative plates 6 at either side of the group of plates 1, bears against the outer side bars of the three members 9, 13 and 14.

From the foregoing, it will be seen that with the positive and negative groups of plates separated and supported in the manner described, that the plates are firmly held at the side edges and corners in fixed relative positions to each other, and that no matter how badly the positive plates may be buckled or distorted, they cannot come in contact with the negative plates at the side edges or corners; and that there can be no upward or downward movement of the insulators, or any movement thereof forward or backward, as such movements are prevented by direct engagement of the insulating members with the plates of the battery. My invention can be used with standard plates as now manufactured and assembled and in the standard jars now used, and in assembling the plates with the use of my invention, it is impossible to so assemble them that a positive and negative plate come into contact. In other words, it is only possible to assemble the plates correctly.

Another advantage is that my invention tends to prevent the occurrence of growth, or what is known as "treeing" between the ends of the plates.

Another advantage of my invention is the speed with which an element can be assembled due to the construction of my insulators.

I claim:

1. In a storage battery, a positive and a negative group of plates interleaved from opposite directions, and unitary insulating members located at the center and ends of the assembled plates, each insulating member having recesses receiving the respective plates in alternation, and presenting interposed bars separating the adjacent plates of the two groups and connected at their upper and lower ends only.

2. In a storage battery, a positive and a negative group of plates interleaved from opposite directions, an insulating member located at the center of the assembled plates comprising a series of parallel bars connected at their tops and bottoms to provide separated spaces through which the plates of the two groups pass in alternation, and end insulating members comprising parallel bars connected to provide separated open spaces receiving the ends of the respective sets of plates in alternation.

3. In a storage battery, a positive and a negative group of plates interleaved from opposite directions, an insulating member in the form of a grid located at the center of the assembled plates and providing separated spaces through which the plates of the two groups pass in alternation, and end insulating members comprising grids providing separated spaces receiving the ends of the respective sets of plates in alternation, the recesses of the respective end insulating members being closed at opposite ends in alternation and in staggered relation with reference to each other.

4. In a storage battery, a positive and a negative group of plates interleaved from opposite directions, and end insulating members comprising grids having a series of separated spaces closed at their upper ends to receive and rest upon the front edge portion of one set of plates, and an alternating series of recesses closed at their bottom ends to receive and support the rear edge portions of the plates of the opposite set.

5. In a storage battery, a positive and a negative group of plates interleaved from opposite directions, and insulating members mounted on the rear edge portion of each set of plates and seperating the same from the end portions of the opposite set of plates, each of said insulating members comprising a series of parallel bars connected in pairs in alternation at their tops and bottoms.

6. In a storage battery, a positive and a negative group of plates interleaved from opposite directions, and insulating members mounted on the rear edge portion of each set of plates and separating the same from the end portions of the opposite set of plates, each of said insulating members comprising a series of parallel bars connected in pairs in alternation at their tops and bottoms, all of said spaces being closed at the top and bottom of the member by a relatively narrow back portion, against which the rear edge portions of one set and the front edge portions of the other set of plates abut.

7. In a storage battery, a positive and a negative group of plates interleaved from opposite directions, and insulating members located at the center and ends of the assembled plates, each of said insulating members comprising spaced parallel bars connected at their upper ends and affording spaces for receiving between them, in alternation, the bars of the two groups and holding the same in separated relation.

In testimony whereof, I have hereunto set my hand.

ROBERT D. RIFKIN.